US 6,556,888 B2

(12) United States Patent
Kantola

(10) Patent No.: US 6,556,888 B2
(45) Date of Patent: Apr. 29, 2003

(54) INTEGRATED SYSTEM FOR HANDLING OF WORK PIECES AND MATERIALS

(75) Inventor: Juhana Kantola, Tampere (FI)

(73) Assignee: Fastems Oy AB, Tampere (FI)

( * ) Notice: Subject to any disclaimer, the term of this patent is extended or adjusted under 35 U.S.C. 154(b) by 0 days.

(21) Appl. No.: 09/876,052

(22) Filed: Jun. 8, 2001

(65) Prior Publication Data

US 2001/0056312 A1 Dec. 27, 2001

(30) Foreign Application Priority Data

Jun. 21, 2000 (FI) .............................................. 20001474

(51) Int. Cl.⁷ ................................................. G06F 7/00
(52) U.S. Cl. ........................ 700/222; 700/214; 700/217
(58) Field of Search .............................. 700/214, 217, 700/222, 228, 229, 230

(56) References Cited

U.S. PATENT DOCUMENTS

| RE30,280 E | 5/1980 | Berman et al. | |
|---|---|---|---|
| 5,475,604 A | * 12/1995 | Nagamatsu | ................. 700/217 |
| 5,536,137 A | 7/1996 | Jäger | |
| 5,985,214 A | * 11/1999 | Stylli et al. | ................. 700/214 |
| 6,169,935 B1 | * 1/2001 | Iwasaki et al. | ............. 700/214 |

FOREIGN PATENT DOCUMENTS

| DE | 32 48 345 A1 | 6/1984 |
|---|---|---|
| DE | 297 23 886 | 4/1999 |
| FR | 2 650 574 | 2/1991 |

\* cited by examiner

*Primary Examiner*—Christopher P Ellis
*Assistant Examiner*—Gene O. Crawford
(74) *Attorney, Agent, or Firm*—Louis Woo

(57) ABSTRACT

A storage and retrieval system of pallets for handling of work pieces. Said system is ready-fitted in one or more freight containers. Preferably, it is arranged to be coupled as a part of an automatic manufacturing system. It can comprise a loading station to be conveyed inside the freight container, which is arranged to be connected outside said freight container for reception and delivery of work pieces. The system contains at least a shelving structure arranged inside the freight container and comprising several storage locations, a lift and transfer apparatus and a control system, which is arranged for maintaining and monitoring of material management and production plans, for controlling the transfers and for data transmission between said control system and another manufacturing system.

20 Claims, 2 Drawing Sheets

INTEGRATED SYSTEM FOR HANDLING OF WORK PIECES AND MATERIALS

BACKGROUND OF THE INVENTION

1. Field of the Invention

The present invention relates to an automatic storage and retrieval system of pallets for handling of work pieces.

2. Description of the Related Art

As is well known, in automatic flexible manufacturing systems (FMS), various loading stations are used, by means of which work pieces located e.g. on a pallet are supplied to the system for machining, storing or another handling. Typically, the system comprises various automatic lift and transfer devices, which, by means of the FMS control system transfer work pieces according to a predetermined or dynamic instruction to different machine tools or devices treating the work piece. The transfer between a shelving system and one or more machine tools is typically conducted by means of lift and transfer devices. The transfer device typically comprises a stacker crane or a transfer carriage, which, for example by means of telescopic forks manipulates the work piece with its base.

In the loading station the work piece arriving in the system and the pallet of the same are received and transferred to a storage rack from which it is transferred forward to the machine tool at the right moment. The control program of the control system contains the manufacturing instructions of each work piece stored therein and the system is connected to the loading station, transfer device and machine tool to transfer the desired work piece in the correct order to the desired one or more machine tools and the control program transmits information to the machine tool so that the desired machining program can be selected. When the work piece is delivered to the loading station, information thereof is at the same time inputted to the control system. Typically the machine tool also contains an intermediate station to which the work piece is delivered. Finished or semi-finished work piece is returned to the storage rack and it can be delivered later via the loading station. In the loading station the piece can be manipulated manually as well as by means of a forklift truck or a crane.

The act of building a shelving and the installation, assembly and test-drive of the transfer carriage in the location of delivery require expert knowledge, and the work takes 150 to 250 hours even in connection with small-scale deliveries. Especially the fastening and support of the shelving and the guiding rails of the transfer carriage to the floor surfaces require a great deal of work and preparations. In addition to this, the control system must be tested on location and for example the final, exact location of the storage locations in the shelving systems must be taught separately to the control system of the transfer carriage after installation. Thus, the installation and testing processes require a great deal of time during which rearrangements interrupt or disturb the production for a long period of time. The installation project consumes employee resources considerably in a company in which the system has been acquired.

SUMMARY OF THE INVENTION

It is an aim of the present invention to considerably reduce the time used for installation and test-drive of the FMS system at the location of installation. In particular, it is an aim of the invention to utilize an integrated system to facilitate the implementation of a shelving, a transfer carriage and a control system and, if necessary, also the implementation of loading stations. The integrated system which is tested in advance and programmed ready for use according to the wishes of the customer, can be rapidly connected to machine tools at the location of installation to produce a complete FMS system. The invention is based on the idea that a rapidly implemented integrated system is arranged into a movable module, for example to a standard transfer container.

It is a considerable advantage of the invention that the amount of installation work required at the location of installation can be reduced even into one tenth of the work typically required therein. The installation work itself at the location of delivery is also considerably facilitated, and special personnel is not required therein. It is possible to abandon the packing and unpacking of individual parts of the system, as the system is transported in a ready-for-use state. The number of fastenings required for fixing the system to the floor is considerably reduced, wherein transfers and changes are possible at a later stage without dismounting the entire system. The structure itself to which the system is placed operates as a support structure and a protective structure for the system, which prevents the access of unauthorized persons to the working area of the transfer device. Working safety during installation is considerably increased. The movable container is also provided with the necessary openings that can be closed, via which openings the transfer carriage can deliver the work piece to a machine tool or to the loading station.

The module also contains a control system which can be taken in use almost immediately, because it has undergone a test-drive and a test during the manufacture of the module itself. Thus, it is possible to provide the control system in advance with manufacturing instructions for the manufacture of different pieces, when the machine tools at the location of delivery are known. The advantage lies in that said modules can be produced in series for the needs of the client. The movable module only requires an input coupling for electricity, as well as electric data transmission connections and interfaces for connecting the module to the machine tools and loading stations of the FMS system.

A special advantage is that the module can be expanded. Thus, behind the first module which comprises at least a control system, a shelving and a transfer carriage, a second module is connected, which comprises at least a shelving and an extension rail arrangement for the transfer carriage. The number of storing locations can thus be increased. The assembly of one or several modules constitutes an automated pallet storage and retrieval system. By providing the module with a removable roof, the height in use in the storing locations can be increased.

It is an advantage that the system is also well suited for temporary production and it can be moved rapidly to another location. By placing the loading station in such a manner that it travels along with the system as well, it is possible to ensure compatibility and the installation work becomes easier and easier. During transport, the loading station is stored inside a freight container, from which it is lifted out and installed in its place on the side of the freight container. The module can also be transferred easily by means of devices used in goods yards or for example in harbours, when a freight container with standard dimensions is used, which also comprises fixing means for example for container cranes.

BRIEF DESCRIPTION OF THE DRAWINGS

In the following, the invention will be described in more detail with reference to the appended drawings, in which.

DETAILED DESCRIPTION OF THE INVENTION

Figure 1:
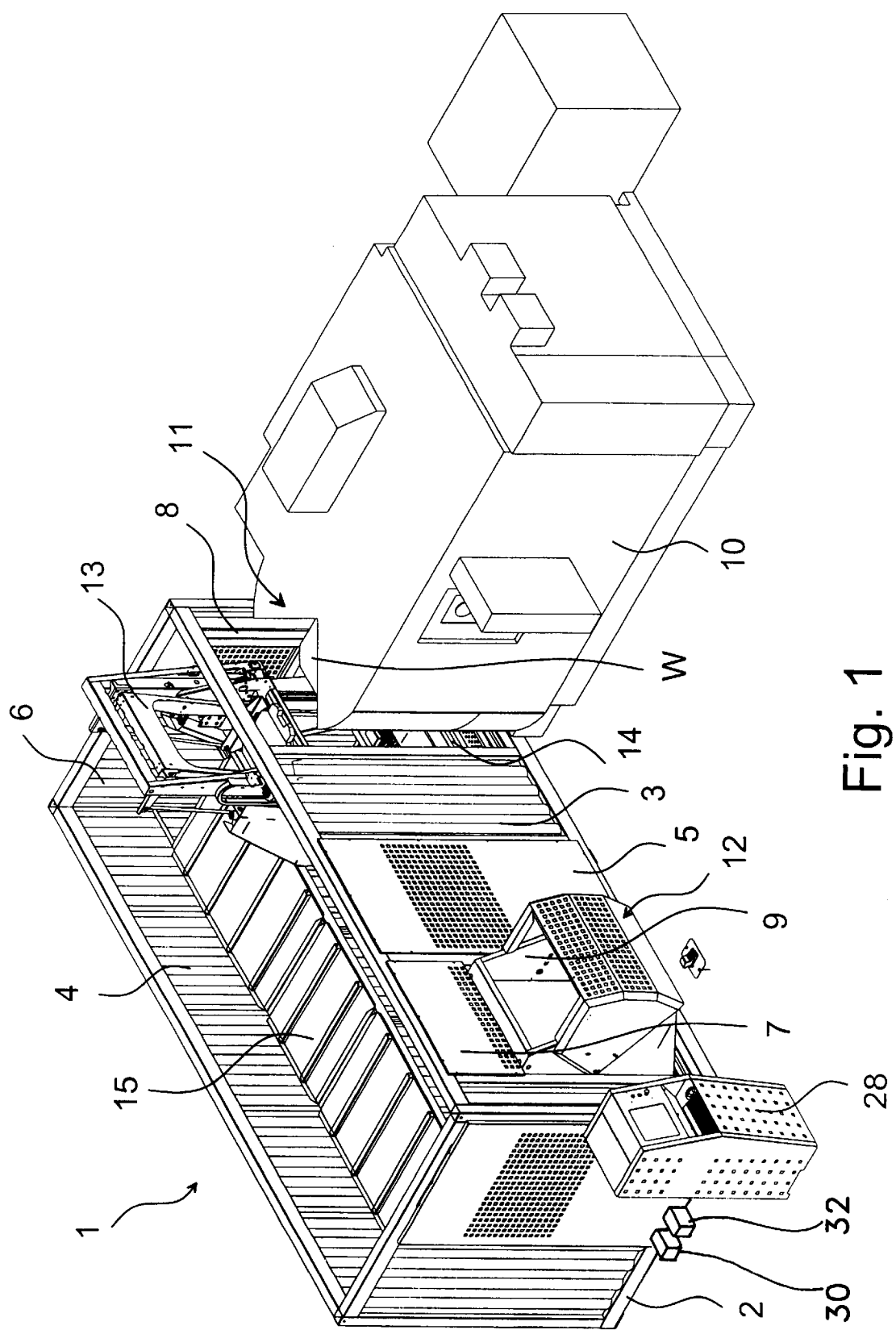
FIG. 1 shows an integrated system according to a first preferred embodiment of the invention in a perspective view.

FIG. 1 shows a first preferred embodiment of the invention that constitutes an integrated system. The freight container 1 is shown with its roof removed. The freight container comprises a floor 2, two side walls 3, 4 and a roof, and another end wall 6. The transport and freight container 1 may have been designed separately and especially for the use according to the invention, wherein it is intended to be transported in a closed state and to be installed as such in its installation location on the floor of a factory. Preferably, the freight container 1 is a steel container according to the ISO standard, and it is intended for transports by ship, per railway or by truck. The size of the container is for example ISO 9'6"/2,6 m, wherein both end walls of the same contain double doors. The inner dimensions of the container are L=12020 m, W=2342 m and H=2693 m. The roof is preferably arranged removable, wherein the upper edge of the work pieces W can extend above the container 1. Similarly, the upper part of the door frame is preferably removable, wherein it is easier to bring goods into the container.

The container 1 of FIG. 1 is equipped with two openings 7 and 8 made on the side wall 3. The openings are closed during the transport. The first opening 7 is reserved for a loading station 9 and the second opening 8 is reserved for a machine tool 10. The machine tool 10 is shown in a simplified representation, and the structure and functions of the same may vary a great deal. The machine tool complies with prior art for example for milling, boring or lathe work. Work pieces W are delivered (and received) through the opening 8 on a pallet or receiving table 11, or the like, in the machine tool 10. The work pieces W are received in the system or delivered from the system through the opening 7 to the pallet or receiving table 12, or the like, in the loading station 9, from which the work piece W can be transferred by means of a forklift truck or a crane. The loading station 9 complies with prior art known as such. The door between the container 1 and the loading station 9 that is necessary for work safety can, according to prior art, be placed in the loading station 9, but it can also be placed in connection with the opening 7, for example so that it moves parallelly with the wall 3 inside the container 1. The door is closed during the movement of the lift and transfer device 13, which is for example a transfer carriage known as such.

The transfer carriage 13 is arranged on the same side with the side wall 3 equipped with openings 7 and 8, and it is arranged to move back and forth in the longitudinal direction of the container 1 on the support of guides 14 or the like, in a manner known as such. The rails 14 and other supporting structures can be fixed to the structures of the container 1. The shelving structure 15 is arranged on the opposite side wall 4. The structure 15 is a double-decker structure and the wall, roof and floor structures of the container can now be utilized in fastening and support. The container 1 forms a particularly strong structure when the roof structure is not removed. The overall height of the storage shelves is thus lower. There is enough room for the transfer carriage 13 to move in the container. The walls of the container 1 simultaneously form a safe protective wall wherein the access on the way of the transfer container and the loads of the same is prevented.

The freight container 1 can also be supplemented with an opening 5 and a material station that functions in a similar manner as the loading station 9, to which it is possible to retrieve raw materials and blanks arranged in storage locations, for example on pallets. The blanks are fastened on the pallets and they are fed back to the system via the loading station 9. At the same time the control system is provided with manufacturing instructions. Thus, the system functions as a material storage at the same time.

During transport, the loading station 9 is preferably placed inside the freight container 1 in which a location and fastenings are reserved for the same. This facilitates the implementation of the system. The container 1 is also provided with couplings 30 for the delivery of current, and in addition to that it also contains the necessary couplings 32 for data transmission e.g. to the loading stations and machine tools. Thus, it is possible to apply cabling and transfer technology of field buses known as such. For example, the sensors of the loading station 9 provide information thereof that the work piece W and its pallets P are positioned in their places. The machine tool 10 can be given a signal to start a fixed working program, or the machine tool gives a signal that the work piece is finished and ready for delivery on the pallet table 11.

The system also contains a movable or integrated device 28 of the control system which is packed in the container 1, said device being for example a computer apparatus known as such that contains a control application. The apparatus is connected via a bus to the operating panels of the loading stations and material stations and to the control system of the transfer carriage. The transfer carriage 13 is given instructions to retrieve or carry work pieces W between different storage locations and pallet tables 11, 12 of the shelving 15. In the control it is possible to apply a system known as such, for example a modular MMS system (Manufacturing Management System), which comprises functions for resource management, for example for management of NC-programs, production plans and tools control and tools selection of the machine tool. If necessary, the NC-programs can even be loaded from the system to the machine tool. Preferably, the system also includes monitoring of production orders and input of the same manually (Production Planning System) via a user interface. The material management of the system maintains information on storage locations. It is possible to connect a PC apparatus to another local network of the installation location, and via a modem to a telephone network. The casings known as such that are required by the control system and the electrification are placed in free locations, for example to replace a storage location, if necessary. The necessary cablings are placed on the walls or on the floor of the freight container.

The display and keyboard of the control system 28 can also be installed in the freight container in such a manner that they can be used via an opening made on the side wall 3, wherein they do not separately occupy floor space. The transfer carriage 13 manipulates the pallets for example by means of telescopic forks known as such, or by means of a hanging parallelogram mechanism that supports the pallet. The term pallet also refers to such bases or trays on the support of which the work piece is transferred and stored, or to which the work piece is fixed for machining or other handling. Furthermore, the pallet can be fixed to the machine tool 10 for example for rotation.

Figure 2:
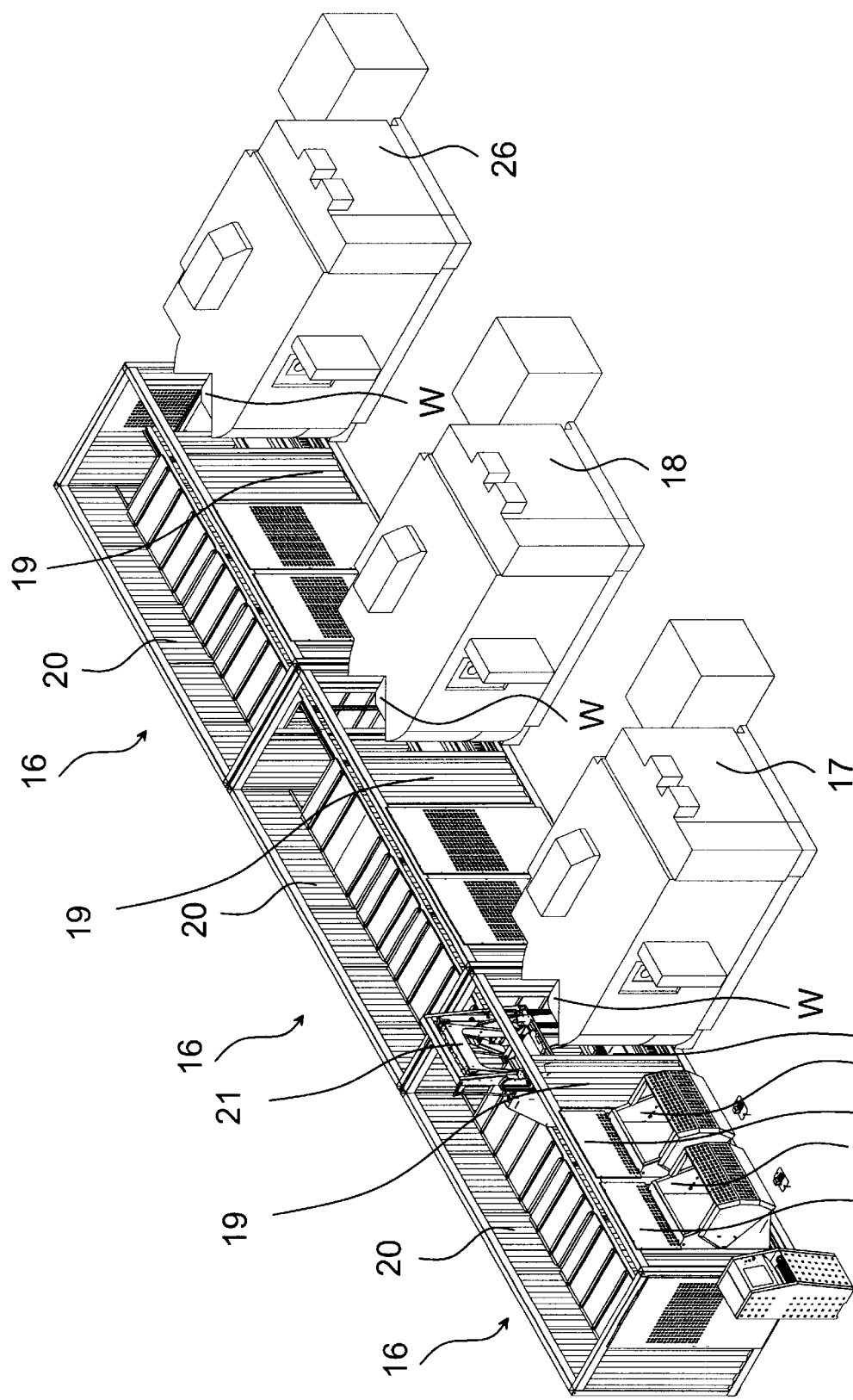
FIG. 2 shows an integrated system according to a second preferred embodiment of the invention in a perspective view.

FIG. 2 shows a second preferred embodiment of the invention, in which three machine tools 17, 18 and 26 and two loading stations 22 and 27 are arranged in connection with the three openings of three freight containers 16 whose open end walls are against each other. The roof structures of the freight containers 16 are removed, wherein the work pieces W can be located higher than the side walls 19, 20. Thus, higher work pieces can be placed in the double-decker storage shelving. The compound systems according to FIGS. 1 and 2 each form a flexible manufacturing system (FMS), which can be rapidly implemented. Rearrangement and transports can be easily conducted. In FIG. 2, the second and the third freight containers do not have to be equipped with a transfer carriage 21, but the necessary extension rail arrangement or the like is sufficient, which is connected to the rail assembly or guides of the other containers, wherein the same transfer carriage 21 is capable of moving inside every freight container.

The delivery of current to the transfer carriage 21 is accomplished for example by means of a coiling electric conductor or conductor rail, and the transmission of data can take place also via an infrared link between the control system and the control of the transfer carriage 21, in a manner known as such. The transfer carriage is capable of reaching the storage locations and placing the work pieces W therein, and it also extends out of the openings 23, 24, 25 of the freight container. When the parallelogram mechanism is used, the rocking movement of the same is changed into a horizontal movement by lowering said mechanism arranged in the structure of the transfer carriage at the same time by means of rails or guides.

With reference to FIG. 1, in a special embodiment of the invention the loading station 9 is hinged preferably at its lower part or its lowest part in the horizontal direction, and in parallel to the side wall 3 on the same side of which the loading station 9 is attached, the side wall 3 containing an opening 7 for the loading station 9. The hinge arrangement is attached to the floor structure 2 or to the side wall 3. During transport it is not necessary to detach the loading station 9, but it is turned on the support of the hinges inside the freight container 1, fixed to its place, and the opening 7 is closed. The loading station 9 contains the necessary locking members and supports by means of which the loading device 9 can be fixed to a vertical position again. In this embodiment the loading station 9 does not have to be detached from the freight container 1 or transported separately, which facilitates the handling considerably.

The present invention is not limited solely to the above-presented and exemplified preferred embodiments, but it can be modified within the scope of the appended claims.

What is claimed is:

1. An automatic storage and retrieval system of pallets for handling of work pieces or materials, wherein said system is ready-fitted in two or more freight containers, and wherein the system comprises:
   a shelving structure arranged inside a freight container and containing several storage locations for storing the work pieces arranged on the pallets,
   a lift and transfer apparatus arranged inside said freight container to receive work pieces outside said freight container, to convey the same to a storage location and to deliver the same outside said freight container, and
   at least two freight containers installed successively as extensions for each other, wherein both containers comprise at least said shelving structure and at least one of them comprises said lift and transfer apparatus, which is arranged to move from one freight container to another.

2. A system according to claim 1, wherein the lift and transfer apparatus is arranged to extend outside the freight container to deliver the work pieces to one or more machine tools, washing apparatuses, intermediate stations and/or other handling devices of work pieces arranged in connection with said freight container.

3. A system according to claim 1, wherein the freight container with its systems is arranged to be coupled as a part of an automatic manufacturing system, which comprises at least one machine tool for the machining and handling of work pieces.

4. A system according to claim 1, wherein each freight container comprises a rail arrangement or guide, connectable to each other, for the lift and transfer apparatus, and wherein the lift and transfer apparatus is capable of moving inside both freight containers.

5. A system according to claim 1, wherein the freight container comprises two side walls, wherein the lift and transfer apparatus is arranged on the same side with the side wall equipped with openings for the transfers of the work pieces, and wherein the shelving structure is arranged on the same side with the opposite side wall.

6. A system according to claim 1, comprising a loading station to be conveyed inside the freight container, which is arranged to be connected outside said freight container for reception and delivery of work pieces.

7. A system according to claim 6, wherein the loading station is pivotally connected to the freight container, wherein the loading station is arranged swivellable inside the freight container for transport and arranged swivellable outside the freight container for use.

8. A system according to claim 1, wherein the freight container comprises a freight container with substantially standard dimensions and structure, which freight container comprises a floor structure, two side walls, and two end walls equipped with doors, and it is provided with a removable roof structure and its side wall is provided with at least one opening, to be closed for the duration of transport, for the transfers of the work pieces.

9. A system according to claim 8, wherein the side wall comprises a first opening for a loading station, provided for reception and delivery of work pieces, and a second opening, provided for delivery of work pieces to a machine tool, washing apparatus, intermediate station or other handling devices of work pieces.

10. A system according to claim 9, wherein the side wall further comprises a third opening for a material station, provided for retrieval of raw materials and blanks.

11. A system according to claim 1, further comprising:
   a control system, which is arranged for maintaining and monitoring of material management and production plans, for controlling of the transfers and for data transmission between said control system and another manufacturing system.

12. A system according to claim 7, wherein the control system comprises a device of the control system positioned inside the freight container or separately from the freight container.

13. A system according to claim 7, wherein the control system comprises a control application functioning in a computer apparatus and equipped with a user interface, which computer apparatus is connected to the lift and transfer apparatus via a bus to transfer selected work pieces in a desired order to the manufacturing system, wherein the computer apparatus is also arranged for input and storage of information of the handling stages selected for the work piece.

14. A system according to claim 13, wherein the computer apparatus is connected via a bus to the control system of one or more machine tools in the manufacturing system to give instructions related to the manufacture of the work piece.

15. An automatic storage and retrieval system of pallets for handling of work pieces or materials, wherein the system is ready-fitted in one or more freight containers and comprises a loading station to be conveyed inside the freight container, which is arranged to be connected outside said freight container for reception and delivery of work pieces, and wherein the loading station is pivotally connected to the freight container so that it could be pivotably moved into the freight container for transport.

16. A system according to claim 15, comprising:
    a shelving structure arranged inside the freight container and containing several storage locations for storing the work pieces arranged on the pallets,
    a lift and transfer apparatus arranged inside the freight container to receive work pieces outside said freight container, to convey the same to a storage location and to deliver the same outside said freight container, and
    a control system, which is arranged for maintaining and monitoring of material management and production plans, for controlling of the transfers and for data transmission between said control system and another manufacturing system.

17. A system according to claim 15, wherein the freight container comprises a freight container with substantially standard dimensions and structure, which freight container comprises a floor structure, two side walls, and two end walls equipped with doors, the freight container being provided with a removable roof structure and its side wall being provided with at least one opening, to be closed for the duration of transport, for the transfers of the work pieces.

18. A system according to claim 17, wherein the side wall comprises a first opening for a loading station provided for reception and delivery of work pieces, and a second opening provided for delivery of work pieces to a machine tool, an intermediate station or other devices fro handling work pieces.

19. A system according to claim 18, wherein the side wall further comprises a third opening for a material station, provided for retrieval of raw materials and blanks.

20. An automatic storage and retrieval system of pallets for handling of work pieces or materials, wherein said system is ready-fitted in one or more freight containers, the system comprising:
    a shelving structure arranged inside a freight container and containing several storage locations for storing the work pieces arranged on the pallets,
    a lift and transfer apparatus arranged inside said freight container to receive work pieces outside said freight container, to convey the same to a storage location and to deliver the same outside said freight container, and
    a control system, which is arranged for maintaining and monitoring of material management and production plans, for controlling of the transfers and for data transmission between said control system and another manufacturing system,
    wherein the freight container comprises at least first coupling means for delivery of current, and at least second coupling means for the data transmission between said control system and the automatic manufacturing system.

* * * * *